Nov. 23, 1965  D. S. COBBLEDICK  3,219,516
BONDED MULTI-LAYER STRUCTURES
Filed July 30, 1962
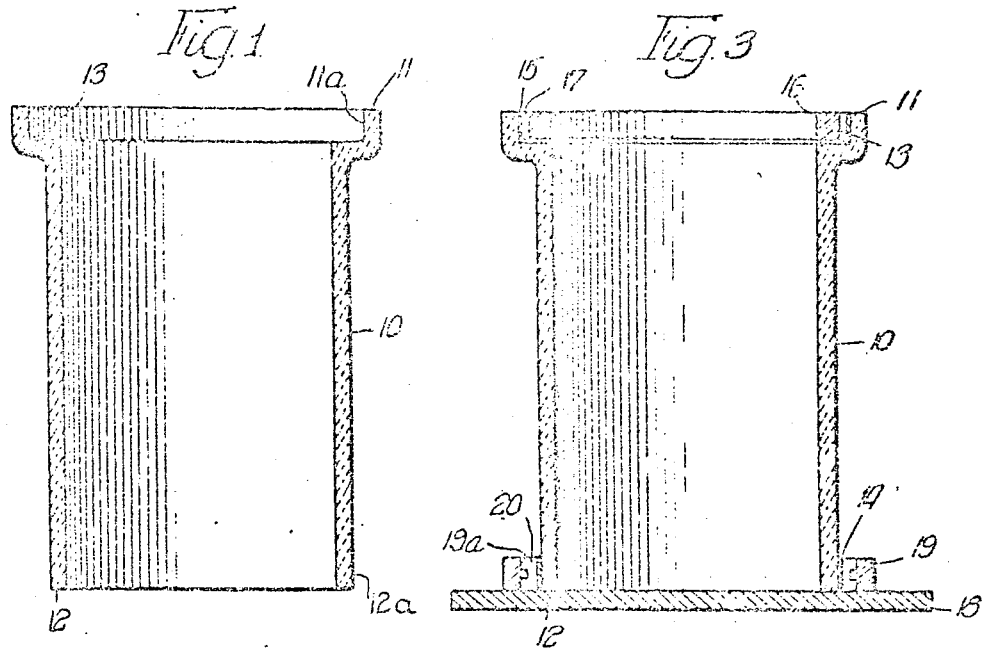
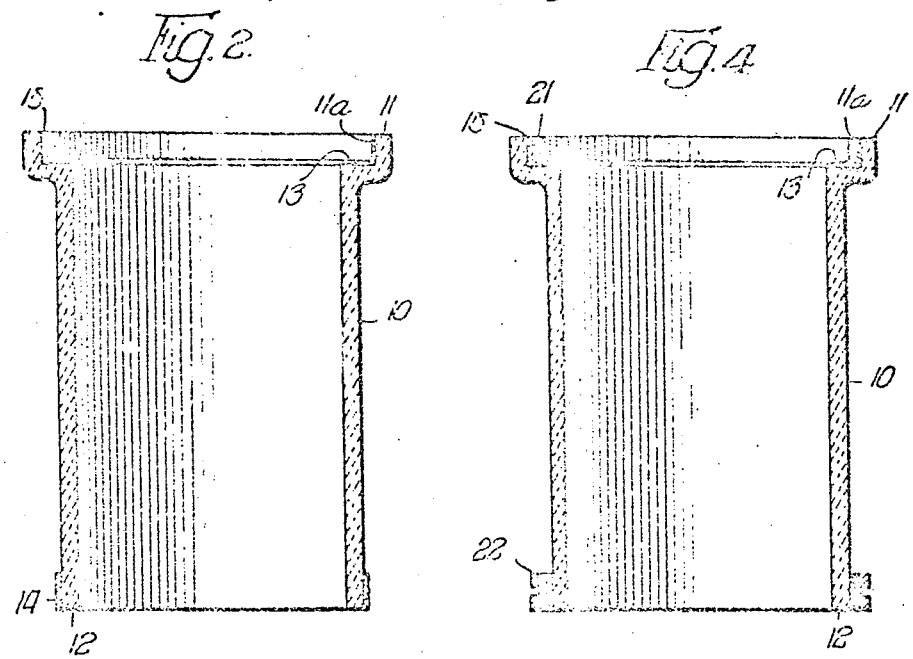
Inventor:
David S Cobbledick

3,219,516
BONDED MULTI-LAYER STRUCTURES
David Stanley Cobbledick, Decatur, Ill., assignor to A. E. Staley Manufacturing Company, Decatur, Ill., a corporation of Delaware
Filed July 30, 1962, Ser. No. 213,164
33 Claims. (Cl. 161—190)

This invention relates to a urethane primer. More particularly, this invention relates to a process of forming an in situ polymerized coating having good adhesion to a substrate, which comprises the steps of (1) providing a prepolymer reaction product of organic polyhydroxy material having an average acid number of from 0 to 10 and at least 1.2 equivalents of organic polyisocyanate per equivalent of organic polyhydroxy material, wherein said polyhydroxy material comprises a linear condensation polymer having a hydroxyl number of from 20 to 100 selected from the group consisting of polyethers and polyesters, (2) applying said prepolymer reaction product to a substrate, (3) drying said prepolymer reaction product, (4) applying an addition-polymerizable, resin-forming composition comprising a monoethylenically unsaturated monomer selected from the group consisting of vinylidene compounds, half-esters of alpha, beta-ethylenically unsaturated dicarboxylic acids and mixture thereof, and a polyethylenically unsaturated material, wherein at least one substituent of said addition polymerizable composition contains Zerewitinoff hydrogen groups, and (5) polymerizing said addition-polymerizable composition in situ to bond it to said substrate.

During the last ten or twenty years, various types of addition-polymerizable coating and caulking compositions have been applied directly to various substrates and then polymerized in situ on the surface of the substrate. Generally this technique has been successful only where the substrate is sufficiently porous (e.g. wood surfaces or cinder blocks) to permit the partial penetration of the surface by the polymerizable composition. Subsequent polymerization of the composition results in the formation of a physical bond between the porous substrate and the polymerized layer. Unfortunately, such techniques have not been too successful for caulking materials, such as those used in salt glazed-clay pipe joints and cast iron pipe joints, and coating materials, such as those used on salt glazed clay tile and on steel, since no physical bond is formed between the substrate and the polymerized coating. The poor bonding of in situ polymerized caulking compositions is compounded by the shrinkage of the caulking material as it polymerizes.

In situ polymerizable coating compositions have been applied as thin layers to normally non-porous substrates, which have either been abraded or primed with a primer to aid adhesion, with more or less success. However, such techniques have been, till now, unsatisfactory for permanently bonding in situ polymerized caulking composition to a substrate, particularly to pipe joints, due to the stresses set up within the caulking compositions. Further as the size of the object to be caulked increases, the more difficult the adhesion problem becomes since the amount of stress on the bond increases with the amount of material to be bonded. In a typical case, where the bell end of a salt glazed clay pipe joint is caulked with a polymerizable caulking composition comprising about 150 parts silica filler and about 100 parts resin former, such as a mixture of an unsaturated polyester and styrene, the circumference of the caulking composition shrinks by from about 1–4%. In many cases where a primer had been employed the caulking material separated from the pipe joint as the caulking material polymerized or shortly thereafter. In other cases where apparently successful caulked pipe joints had been cast, the caulking pulled away from the primed pipe after shipment to the job site and outdoor storage. This is a relatively common occurrence during the winter months, when the stored pipes are subjected to repeated freezes and thaws, since the contractions and expansions of the pipe joints under these conditions increases the stresses upon the bond. To the best of my knowledge the two best primers available are (1) a vinyl trichlorosilane primer formulated by me which can be used successfully as a primer for 8" pipe but cannot be used for 18" or 24" pipe (again because of the increased stress in the larger joint) and (2) an epoxy resin which has an unduly long dry time of about 3 hours. The term "dry time" refers to the period required before a primed substrate can be coated with a top coat and still have the top coat adhere to the substrate.

The object of this invention is to provide a new, improved primer which forms a permanent, weather-resistant bond between non-porous substrates and in situ polymerized material. The primer of this invention is a urethane prepolymer reaction product of an organic polyhydroxy material having an average acid number of from 0 to 10 and at least 1.2 equivalents of organic polyisocyanate per equivalent of organic polyhydroxy material.

Other and further objects of the present invention will be apparent from the following detailed description taken in conjunction with the accompanying drawing wherein:

FIGURE 1 is a cross-sectional view of a pipe section;

FIGURE 2 is a view, similar to FIGURE 1, of the pipe section after it has received the urethane primer of the present invention;

FIGURE 3 is a view, similar to FIGURES 1 and 2, illustrating the manner in which the in situ addition polymerizable caulking is emplaced; and FIGURE 4 is a view illustrating the pipe section with the polymerized caulking composition applied thereto and the mold forms removed.

In referring to the drawing, and with particular reference to FIGURE 1, a length of pipe 10 having a bell end 11 and a spigot end 12 is illustrated. Bell end 11 is equipped with a radial flange portion 13.

In accordance with the present invention, a urethane prepolymer reaction product, the preparation and composition of which are more fully explained below, is applied to the outer surface 12a of the spigot end of pipe section 10. The primer is preferably applied in a thin layer 14. Similarly, at the bell end 11 of pipe end 10, a primer layer 15 is applied to the radial flange 13 and inner wall 11a. Primer layers 14 and 15 are then permitted to dry.

After drying, a ring 16, previously treated with a mold release agent, is placed on the radial flange 13 thereby forming a mold 17 between ring 16 and primer layer 15 at the bell end 11. As is shown in FIGURE 3, spigot end 12 is supported on a base 18 so that a ring 19 can be placed therearound in surrounding relationship to provide a mold 20 between primer layer 14 and the inner surface 19a of the ring 19. If desired, ring 19 can be formed in sections for facilitating removal.

An in situ addition polymerizable compound is then prepared, in the manner explained below, and poured into the respective molds 17 and 20. As soon as the addition polymerizable compound hardens and bonds to the primer layers 14 and 15, the rings 16 and 19 are removed. Accordingly, as is shown in FIGURE 4, the bell end of the pipe will be provided with a multilayered caulking composition which includes a polyurethane primer layer 15 and an in situ polymerized layer 21 bonded thereto. Similarly, bell end 11 of the pipe 10 includes a polyurethane primer layer 14 and a similarly bonded in situ polymerized layer 22. The caulked pipe sections can be joined together in the field in accordance with conventionally known techniques.

THE URETHANE PRIMER

The urethane primer of this invention comprises three essential ingredients which are: a polyisocyanate, a difunctional, essentially linear polyhydroxy condensation compound having a hydroxyl number of from about 20 to 100 and a polyhydroxy compound having a functionality of 3 or more. The polyisocyanate apparently functions in at least 3 ways which are: (1) reacts with the polyhydroxy material of the primer to form a high molecular weight polymer, (2) reacts with Zerewitinoff active hydrogen groups of the in situ polymerizale layer to chemically bind the top layer to the primer, and (3) reacts with the substrate in a manner sufficient to bind the primer to the substrate, probably by chemical bond. The essentially difunctional linear polyhydroxy condensation compound having a hydroxyl number of from about 20 to 100 gives the primer layer flexibility and elasticity while the polyhydroxy compound having a functionality of 3 or more gives the primer tensile strength. The omission of any one of these ingredients results in a primer unsuitable for most purposes.

In greater detail, the essentially linear difunctional condensation polymer has an acid number of from about 0 to 10 and a hydroxyl number of from about 20 to 100, preferably from 40 to 80. These linear condensation polymers include polyethers prepared from the condensation of ethylene oxide, propylene oxide, tetrahydrofuran, etc. alone or with various glycols and hydroxy terminated polyesters. The hydroxy terminated polyesters can be prepared from 1 or more aliphatic dicarboxylic acids, such as adipic acid, malonic acid, succinic acid, methyladipic acid, maleic acid, thiodipropionic acid, diethylether-dicarboxylic acid, sebacic acid, suberic acid, etc. and 1 or more glycols, such as ethylene glycol, 1,2-propylene glycol, 1,3-propylene glycol, 1,3-butylene glycol, 1,4-butylene glycol, 1,6-hexane diol, methyl hexane-1,6-diol, 1,4-butene diol, diethylene glycol, triethylene glycol, thiodiglycol, 2,2-dimethyl-1,3 propylene glycol, etc. Hydroxycarboxylic acids and lactones can also be used to prepared these linear polyesters. Other bifunctional reactants which are complementary to the acids and glycols can be used in smaller proportions, such as phthalic acid, terephthalic acid, p-phenylene diamine, aminopropanol, etc. However, the preferred linear; essentially difunctional condensation polymers are polyesters of adipic acid and ethylene glycol and/or 1,2-propylene glycol having a hydroxyl number of from about 40 to 80. These linear, essentially difunctional polyhydroxy condensation polymers and the polyhydroxy material having a functionality of at least 3 are present in a weight ratio of about 4:1 to 1:4, preferably from about 3:1 to about 2:3. When the linear, essentially difunctional polyhydroxy condensation polymers is present in a weight ratio higher than 4:1, the primer layer has low tensile strength while at a ratio less than 1:4, the primer is not sufficiently flexible. In either case the bond formed between the substrate and top layer is unsatisfactory for caulking applications.

The polyhydroxy material having a functionality of 3 or more can be a relatively simple polyol such as glycerin, trimethylol propane, trimethylol ethane, pentaerythritol, hexane triol, N,N,N',N'-tetrakis(2-hydroxyethyl) - ethylenediamine (this compound also has catalytic properties as described below), etc. or a condensation product of one or more of these polyols with one or more of the aforementioned linear polyether-forming reagents and/or polyester reagents. Generally the preferred polyhydroxy materials having a functionality of at least 3 are polyester condensation products of a triol (particularly trimethylol ethane or trimethylol propane) with a difunctional acid (particularly adipic acid) and a difunctional glycol (particularly ethylene glycol and/or 1,2-propylene glycol) having a hydroxyl number of from about 120 to about 225 and an acid number less than 10. These preferred hydroxy-terminated polyesters, particularly those having a hydroxyl number of from about 120-180, form somewhat flexible urethane coatings when used by themselves and accordingly complement the flexibilizing effect of the essentially linear difunctional polyethers and polyesters. It is within the scope of this invention to prepare a mixture of essentially linear difunctional condensation polyesters and trifunctional condensation polyesters at the same time by the choice of suitable proportions of reactants and reaction conditions.

The polyhydroxy component of the urethane primer can also include low molecular weight diols, such as ethylene glycol, diethylene glycol. N,N-di-(hydroxyethyl)-methylamine (this compound also has catalytic properties as explained below), without adverse effect on the bonding strength of the primer.

The polyisocyanates used in this invention can include aliphatic and aromatic diisocyanates such as tetramethylene diisocyanate, pentamethylene diisocyanate, hexamethylene diisocyanate, thiodipropyl diisocyanate, phenylene diisocyanate, chlorophenylene diisocyanate, toluene diisocyanate, naphthalene diisocyanate, durene diisocyanate, etc. The aromatic diisocyanates and particularly toluene diisocyanate, which is available commercially in mixtures of the 2,6 and 2,4 isomers, are preferred. The isocyanate groups in the 2,6 position of toluene 2,6-diisocyanate, and in the 2-position of toluene 2,4-diisocyanate are sterically hindered and accordingly compositions containing these isomers in the proper isocyanate-to-hydroxyl ratio have a relatively good pot life.

For converting the polyhydroxy material into the prepolymer reaction product care must be taken that the ratio of isocyanate groups to hydroxyl groups is at least 1.2 to 1 and preferably at least 2 or 3:1. In this prepolymer reaction, the hydroxyl end groups of the hydroxy material are converted into isocyanate end groups. Depending upon the excess of diisocyanates, several polyhydroxy units can be linked together. In the case of a small excess up to 3 units may be linked, whereas in the case of larger excess no chain extending occurs at all. When the isocyanate-to-hydroxyl ratio is over 2:1 there will even remain some free diisocyanates in the mix. The more chain units which are linked together and the fewer the number of free isocyanate groups, the shorter the pot life of the primer. While acceptable bonding has been obtained in the laboratory using primer compositions having a low ratio (e.g. 1.35:1); such compositions do not have the necessary pot life for use by untrained routineers under varying humidity conditions. In open containers water from the atmosphere readily reacts with isocyanate groups forming a urea linkage between two isocyanate groups. Accordingly in order to insure that an open container of primer has a pot life of at least 4 hours, I prefer to use an isocyanate-to-hydroxyl ratio of at least 2 or 3:1.

The urethane primer of this invention usually and preferably contains a catalyst, such as a tertiary amine, which may or may not contain hydroxyl groups, or an organotin compound. From a cost point of view tertiary amines, such as N,N-di-(2-hydroxyethyl)methylamine, diethylcyclohexyl amine, N,N,N',N'-tetrakis(2-hydroxyethyl) - ethylene - diamine, N-ethyl morpholine, methyl piperidine, dimethylpiperazine, tribenzyl-amine, tetramethyl-diaminodipropyl ether, etc. are more desirable than the organotin compounds. The preferred tertiary amine catalysts of this invention are N,N-di-(2-hydroxyethyl)methylamine and diethylcyclohexyl amine (also called hexahydrodiethyl aniline). Urethane primers using either of these catalysts have a dry time of about 5 to 15 minutes. On the other hand primers based on N,N,N',N'-tetrakis(2-hydroxyethyl)ethylene diamine have considerably longer dry times of about 15-20 hours.

The active ingredients of the urethane primer of this invention are dissolved in a relatively volatile anhydrous solvent such as one or more of the following: cellosolve acetate, butyl acetate, methyl ethyl ketone, ethyl acetate, methyl isobutyl ketone, toluene, xylene, etc. The solvent makes the primer much easier to handle and apply in thin layers. It also helps prolong the pot life of the primer. Non-reactive pigments, such as lithol red, toluidine red, cadmium red, iron oxide red, cadmium orange, molybdate orange, cadmium yellow, Hansa yellow, iron oxide yellow, chrome oxide green, phthalocyanine green, phthalocyanine blue, ultramarine blue, carbon black, bone black, iron oxide black, titanium dioxide, lithopone, antimony dioxide, umber, iron oxide brown, etc. can be added to the primer. The pigment allows the user to tell by inspection whether the substrate to be coated has been primed or not. This is particularly useful when a primer which has a long dry time is employed.

All of the ingredients of the urethane primer can be formulated together and then shipped. However, it is generally preferred to mix all the ingredients of the primer together except the diisocyanate and have the user blend in the diisocyanate. While the former method is more convenient for the user, the latter method insures that the primer has good pot life at the job site.

IN SITU POLYMERIZABLE COMPOSITION

The in situ addition-polymerizable resin-forming composition of this invention comprises at least two components which are: a monoethylenically unsaturated compound and a polyethylenically unsaturated compound, wherein at least one substituent of said addition polymerizable composition contains active Zerewitinoff hydrogen groups. The active Zerewitinoff hydrogen groups are necessary in order to insure the formation of a chemical bond between the primed substrate and the in situ polymerized composition.

The polyethylenically unsaturated compounds include the ethylenically unsaturated polyesters which are the reaction product of one or more polycarboxylic acids and one or more polyhydric alcohols. Such products are terminated by hydroxy and/or carboxyl groups and accordingly contain active Zerewitinoff hydrogen groups. One or more of the components of the polyester must be ethylenically unsaturated, preferably the polycarboxylic acid component. Typical unsaturated polycarboxylic acids include dicarboxylic acids such as fumaric acid, maleic acid, maleic anhydride, itaconic acid, citraconic acid, etc. Of these maleic anhydride and fumaric acid are preferred. Typical saturated polycarboxylic acids include dicarboxylic acids, such a phthalic acid, isophthalic acid, succinic acid, adipic acid, suberic acid, sebacic acid, azelaic acid, etc. Typical polyhydric alcohols include glycols, such as ethylene glycol, diethylene glycol, triethylene glycol, tetraethylene glycol, propylene glycol, dipropylene glycol and hexylene glycol; triols, such as glycerin, trimethylol ethane, trimethylol propane and hexane triol; pentaerythritol; etc.

When an ethylenically unsaturated polyester is used in a caulking composition it is usually desirable that the polyester be a flexible polyester, preferably, or a semi-rigid polyester although mixtures of these may be used with rigid polyesters. Flexible polyesters form copolymerizates with vinylidene monomers (preferably styrene) having an elastic modulus of from about 10 to about 10,000 p.s.i. while semi-rigid polyesters form copolymers having an elastic modulus of from about 10,000 to 150,000 p.s.i., i.e. less than about 150,000 p.s.i. In addition, rigid polyesters, which form copolymerizates having an elastic modulus of from about 150,000 to 600,000 p.s.i. can be used as the sole polyester in in situ polymerized coating compositions in addition to the flexible and semi-rigid polyesters. Generally, the non-rigid polyesters contain from about 95–50 mole percent saturated dicarboxylic acid and correspondingly 5–50 mole percent alpha, beta-ethylenically unsaturated dicarboxylic acid, while the polyhydroxy component is principally a glycol.

Usually the longer the chain length of the glycols or saturated dicarboxylic acid components making up the polyester the more flexible the polyester. Aromatic components (which are considered saturated materials for the purpose of this invention), particularly phthalic acid, are not as effective as long chain saturated aliphatics in lowering the elastic modulus of a copolymer. However, the low cost of phthalic acid usually makes it a desirable component.

The ethylenically unsaturated polyesters comprise from about 30 to 80 weight percent of the in situ polymerizable resin-forming components. The remaining 70 to 20 weight percent of the in situ polymerizable resin-forming ingredients comprises a vinylidene monomer selected from monovinyl aromatics, such as vinyl toluene and styrene, alkyl esters of alpha, beta-ethylenically unsaturated monocarboxylic acids, such as methyl methacrylate, methyl acrylate, ethyl acrylate and 2-ethylhexyl acrylate, vinyl esters such as vinyl acetate and propionate. The preferred vinylidene monomers are styrene and vinyl toluene. If desired, various other difunctional materials such as diallyl phthalate may be added to the composition.

Another class of polyethylenically unsaturated materials which can be used in this invention include acryloxy-substituted fatty-acid esters having an average of at least 1.3 acryloxy groups per molecule. A number of these acryloxy-substituted fatty-acid esters are disclosed and claimed in application Serial No. 126,394, filed June 8, 1961; application Serial No. 119,339, filed June 26, 1961, and application Serial No. 119,340, filed June 26, 1961, now Patent No. 3,125,592, which are continuations-in-part of forfeited application Serial No. 800,071 filed March 18, 1959; application Serial No. 167,153, filed January 18, 1962, and application Serial No. 167,154, filed January 18, 1962. In general, these materials form films that retain somewhat more tack than the aforementioned polyesters and accordingly, they are preferably used in caulking compositions where their inherently superior flexibility characteristics can be best utilized.

In somewhat greater detail the acryloxy-substituted fatty-acid esters have the structure:

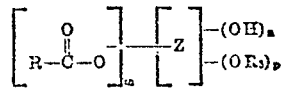

wherein each R is independently an open chain of from 10 to 24 carbon atoms containing at least one segment in said open chain having the structure

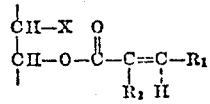

X is hydrogen, halogen or hydroxyl; $R_1$ is hydrogen or

when $R_1$ is hydrogen, $R_2$ is hydrogen, alkyl of from 1 to 4 carbon atoms, alkoxy of from 1 to 4 carbon atoms, halogen, phenyl, benzyl or

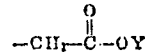

when $R_1$ is

$R_2$ is hydrogen, halogen or alkyl of from 1 to 4 carbon atoms; Y is an aliphatic or aromatic monovalent radical of up to 18 carbon atoms; $R_3$ is independently an acyl radical of from 1 to 25 carbon atoms or an alkyl radical of from 1 to 18 carbon atoms; Z is the residue of a hydroxyl compound, $m$ is a number of from 1 to 6, $n$ is a number of from 0 to 5, $p$ is a number of from 0 to 5, and the sum of $m$, $n$ and $p$ is 1 to 6, the number of hydroxyl groups in the original hydroxyl compound.

In general, the acryloxy-substituted compounds can be prepared by the techniques disclosed in the aforementioned copending applications, such as (1) reacting polyepoxidized fatty material with an acid acrylic compound which results in X be hydroxyl, (2) reacting a polyepoxidized fatty material with an acid acrylic halide compound which results in X being halogen, (3) reacting a polyethylenically unsaturated fatty material with an alkyl hypohalite and an acid acrylic compound which results in X being halogen and, (4) reacting a polyethylenically unsaturated fatty material in situ generated hypochlorous acid and an acid acrylic compound which results in X being halogen. Other techniques can be employed such as reacting an acid acrylic halide compound or an acid acrylic anhydride with a polyhydroxy substituted fatty material, such as castor oil, which results in X being hydrogen.

The following compounds are representative of the various acid acrylic compounds from which the acryloxy groups in the above formula can be derived by the aforementioned techniques: acrylic acid; methacrylic acid; ethacrylic acid; alpha-chloroacrylic acid; alpha-bromoacrylic acid; alpha-iodoacrylic acid; alpha-phenylacrylic acid; alpha-benzylacrylic acid; alpha-propoxyacrylic acid; methyl hydrogen itaconate; methyl hydrogen maleate; methyl hydrogen fumarate; methyl hydrogen mesaconate; methyl hydrogen citraconate; ethyl hydrogen maleate; ethyl hydrogen fumarate; n-propyl hydrogen maleate; isopropyl hydrogen fumarate; n-butyl hydrogen maleate; tertiary-butyl hydrogen fumarate; isoamyl hydrogen fumarate; 4-methyl-2-pentyl hydrogen fumarate; n-octyl hydrogen maleate; 2-ethylhexyl hydrogen fumarate; decyl hydrogen fumarate; lauryl hydrogen maleate; n-tridecyl hydrogen maleate; stearyl hydrogen fumarate; octyldecyl hydrogen maleate; phenyl hydrogen maleate; p-cresyl hydrogen fumarate; benzyl hydrogen maleate; naphthyl hydrogen fumarate; ethyl hydrogen chlorofumarate; cyclohexyl hydrogen maleate; p-cresyl hydrogen maleate; p-chlorophenyl hydrogen maleate; ethoxyethyl (Cellosolve) hydrogen fumarate; p-decylphenyl hydrogen maleate; allyl hydrogen maleate; etc.

The preferred acid acrylic compounds are the half-esters of fumaric acid having from 4 to 13 carbon atoms in the alcohol moiety. These compounds are particularly useful because of their high rate of addition polymerization and because of the additional plasticizing effect of the alkoxy group of the half-ester.

The alcohols from which Z in the preceding formula may be derived contain from 1 to 6 hydroxyl groups and from 1 to 24 carbon atoms. They may be open chain compounds such as glycerol and sorbitol or cyclic compounds such as p-dimethylolcyclohexane. Among the suitable monohydric alcohols are methanol, ethanol, octadecanol, etc. Among the suitable dihydric alcohols are ethylene glycol, hexamethylene glycol, and the polyoxyalkylene glycols in which the oxyalkylene groups have 1 to 4 carbon atoms, i.e., the polyoxymethylene glycols, the polyoxyethylene glycols, the polyoxypropylene glycols, etc. Additional suitable higher polyhydric alcohols are pentaerythritol, arabitol, mannitol, trimethylol propane, trimethylol ethane, trimethylol methane, etc.

As can be seen from the above formula, when Z is a polyhydric alcohol it can be partially esterified with a long-chain carboxylic acid, e.g., diglycerides. Also the polyhydric alcohol Z may be esterified in part by an acid such as stearic acid, acetic acid or benzoic acid, which does not contain any polymerizable acryloxy segments. Likewise, the polyhydric alcohol may be etherified in part with an alkyl halide such as ethyl chloride, stearyl chloride, etc., which may or may not contain additional substituents.

In general, the preferred fatty-acid ester backbones are derived from ethylenically unsaturated naturally occurring glyceride oils and their corresponding epoxidized products, such as soybean oil, corn oil, cottonseed oil, hempseed oil, tung oil, safflower oil, peanut oil, tobacco seed oil, cod oil, herring (or menhaden) oil, castor oil, etc., or from tall oil fatty acid esters of polyhydric alcohols containing 3 or more hydroxyl groups.

While as few as 30 mole percent of the acryloxy-substituted fatty-acid esters can contain at least 2 acryloxy substituents (polyacryloxy-substituted fatty-acid esters) per molecule, I prefer that from about 50 to 100 mole percent of these acryloxy-substituted fatty-acid esters contain at least two acryloxy substituents per molecule. For convenience the useful polyacryloxy-substituted fatty-acid esters may be viewed as having an average of at least 1.3 acryloxy substituents for the entire content of acryloxy-substituted fatty-acid ester. The various acryloxy-substituted fatty-acid esters may all be based on the same or mixtures of different acid acrylic compounds and/or fatty-acid ester backbones.

The acryloxy-substituted fatty-acid esters comprise from about 40 to 70 weight percent of the polymerizable monomeric material (resin-forming material) of the in situ polymerizable material. The remaining 30 to 60 weight percent of the polymerizable monomeric material comprises ethylenically unsaturated monomers such as residual acid acrylic compound, which has not reacted with the long chain fatty ester in the aforementioned acylation of the long chain fatty ester, monovinyl aromatics, for example, styrene and vinyl toluene; alkyl esters of alpha, beta-ethylenically unsaturated monocarboxylic acids, for example, methyl methacrylate, ethyl acrylate, 2-ethylhexyl acrylate, etc. Usually, residual acid acrylic compound will comprise from about 1 to 25 weight percent of the polymerizable monomeric material and preferably the acid acrylic compound will not be present in excess of about 5 parts for each 13 parts of acryloxy-substituted long chain fatty ester. The residual acid acrylic compound insures the presence of active Zerewitinoff hydrogen groups in these compositions. Generally, it is most economical to employ as much as possible of a monovinyl aromatic having the formula

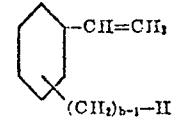

$b$ being a number from 1 to 2. However, in some cases plasticizing monomers, such as 2-ethylhexyl acrylate, are desirable in order to give the in situ polymerized composition the proper flexibility.

While various other polyethylenically unsaturated compounds, such as diallyl phthalate and the so-called allyl resins, can be used as the polyethylenically unsaturated component of the in situ resinifying composition, I prefer to use the aforementioned acryloxy-substituted fatty acid esters and ethylenically unsaturated polyesters.

The above in situ polymerizable composition can be applied in clear layers, if desired, or in pigmented layers using any of the pigments described above. The pigments used in the in situ polymerizable composition do not have to be non-reactive with the urethane primer. These compositions can also be blended with one or more fillers, such as silica flour, barium sulfate, calcium carbonate, starch, clay, chopped glass fibers, sand, Cab-O-Sil, etc. Usually little or no filler is used in coating compositions while as much as 40-80% by weight of a caulking composition can be filler. For example, in clay pipe caulking compositions a filler, preferably silica flour which will pass through a 100 or 200 mesh screen, comprises from about 40-80% by weight of the caulking composition.

while the resin forming materials comprise from about 60 to 20% by weight.

PROCESS

A typical method of employing the primer of this invention comprises adding diisocyanate to the various other components of the primer composition (anhydrous solvent, polyhydroxy material, catalyst and pigment). The resultant composition can be applied immediately as a thin layer directly to the substrate. However, I prefer to allow the primer composition to go through its exotherm in the container and then cool before applying it to the substrate. In either case the primer is extremely effective. However, it has been found that as the primer ages (within its pot life expectancy) its subsequent bonding strength improves. As a practical matter, however, little attention is given to this by the practitioner in the field. After application, the primer is allowed to dry for from about 5 minutes to several days, depending upon the catalyst as explained above. Then the in situ polymerizable composition is applied to the primed surface.

When the primer has been applied to the spigot end and bell end of a clay pipe joint, the spigot end is placed on a suitable flat surface. The spigot end is surrounded by a carefully dimensioned ring, which has been treated with a mold release agent, such as polyvinyl stearate, petrolatum, carbowax, etc., forming a mold between the pipe and the ring to receive the joint forming material. Correspondingly, a ring is placed in the bell end. In each case, the ring and pipe end are essentially concentric and form an annular mold between said ring and pipe end. The polymerizable caulking composition comprising the polyethylenically unsaturated material, monoethylenically unsaturated material and filler mixed with one or more free radical catalysts, such as dibenzoyl peroxide, methyl ethyl ketone peroxide, hydroxyheptyl peroxide, etc., is then poured into the mold to the proper height to form the joint defined by the mold. External heat may be applied to polymerize the resin forming materials. However, it is generally preferable to add one or more accelerators (or driers) such as cobalt naphthenate, cobalt octoate, dimethyl aniline, etc., to the polymerizable material in order to get a room temperature cure.

When a room temperature cure is desired, it is advantageous to employ a mixing gun which is fed by two tanks. The first tank contains all the components of the polymerizable composition (catalyst, polymerizable monomers, filler, etc.) except the accelerator which are either mixed together in the tank or in separate compartments while the second tank contains all the components of the polymerizable composition (including the accelerator) except the catalyst. All the components are mixed in the mixing gun and flowed at a steady rate from the gun into the molds. Usually the polymerizable composition will set to a solid mass which is substantially bonded to the pipe in from about 3 to about 15 minutes. At this point the molds are removed from the pipe.

Essentially the same technique is employed for coating using any of various types of apparatus such as spray guns, curtain coaters, etc., to apply the individual layers. Alternatively, the external layer to be bonded to the substrate may be cast in place using a suitable mold very much in the manner described above.

The following examples are merely illustrative and should not be construed as limiting the scope of the invention. In the examples, the word "parts" refers to parts by weight.

In the examples to follow structural clay products are employed as the substrate since their extremely smooth surfaces present a particularly severe bonding problem.

Example 1

A preferred primer of this invention was prepared by mixing 10 parts of Mondur TD-80 (a mixture of 80 parts 2,4-toluene diisocyanate and 20 parts 2,6-toluene diisocyanate) with 65 parts of a mixture of 2,492 parts ethyl acetate (urethane grade), 48 parts methyl diethanol amine, 80 parts C.P. cadmium medium red #300 pigment, 288 parts Multron R-12 (a moderately branched polyester having an acid number 4.0, hydroxyl number of from 158 to 170 and an equivalent weight of 337, which is believed to be condensation product of trimethylol propane, propylene glycol, ethylene glycol and adipic acid) and 432 parts Multron-18 (a polyester having an acid number of 15, a hydroxyl number of from 47 to 63 and an equivalent weight of 920, which is believed to be the condensation product of ethylene glycol, adipic acid and a minor proportion of phthalic acid). The primer composition was allowed to stand for about 15 to 30 minutes during which time the primer exothermed. The primer was then applied as a thin layer to the bell end and spigot end of an 8-inch diameter salt glazed clay pipe. After the primer was permitted to dry for about 10 minutes, a ring was placed inside the bell end of the pipe and a second ring was placed around the spigot end of the pipe. The rings had been previously treated with a mold release agent, comprising 30 parts by weight Kyrax A (a polyvinyl stearate polymer) and 70 parts by weight of Skellysolve C (heptane).

A caulking composition was prepared in the following manner. Sixty-seven parts of 2-ethylhexyl fumaryloxy hydroxy soybean oil (containing 20.5% by weight free 2-ethylhexyl hydrogen fumarate), 22 parts styrene and 11 parts 2-ethylhexyl acrylate were blended with 180 parts of silica flour (Sterling 200 mesh), 0.02 part 1,4-naphthoquinone and 0.05 part Emulphor EL-620. One half part methyl ethyl ketone peroxide and one half part bis-1-hydroxy cyclohexyl) peroxide were added to one half of the aforementioned composition. One part cobalt naphthenate and 0.5 part dimethylaniline was added to the other half of this composition. The two compositions were then mixed together and poured into the bell end of the pipe. The fumaryloxy hydroxy soybean oil product gelled in about 2½ to 3 minutes. Shortly thereafter, the ring was pulled from the bell end. The joint now had a perfectly cylindrical surface. A similar composition was prepared and applied to the spigot end of the pipe with essentially the same results.

The bond between the clay pipe of the type described above and the polymeric caulking material was tested in the following manner. The pipe was soaked in water for 4 hours at room temperature, then was placed in a food freezer at 0° F. for 16 hours, and then removed from the food freezer and equilibrated for 4 hours at room temperature. After 30 cycles there was no sign of any deterioration in the bond between the pipe and the caulking composition. The above freeze-thaw cycling was designed to simulate outdoor storage during the winter.

The 2-ethylhexyl fumaryloxy hydroxy soybean oil was prepared as follows. One mole of maleic anhydride (98 grams) was weighed into a flask equipped with a stirrer, thermometer, condenser and dropping funnel and then heated to 110° C. One mole of 2-ethylhexanol (130 grams) was added slowly (approximately 20 minutes) through the dropping funnel while maintaining the reaction mixture at 110° C. The temperature was maintained at 110° C. for forty minutes after the addition of 2-ethylhexanol was complete. The resultant half-ester of maleic acid was isomerized by heating at 110° C. for 12 minutes in the presence of sixty-eight hundredths of a gram of phosphorus trichloride. Immediately thereafter, 250 grams of epoxidized soybean oil containing 6.46 by weight of oxirane (1 equivalent) and 0.23 gram of basic zinc sulfoxalate formaldehyde (0.0013 mole) was added to the half-ester reaction vessel. The reactants were maintained at 135° C. until the oxirane value (by HBr-acetic acid titration) was less than 0.10 m.eq./g. (40 minutes). The product after cooling was a viscous, clear, pole yellow liquid having on an average two fumaryloxy hydroxy groups for each molecule of epoxidized soybean oil reacted. The product analyzed:

| | |
|---|---|
| Free 2-ethylhexyl hydrogen fumarate (percent by wt.) | 20.5 |
| Saponification _____meq./g__ | 5.92 |
| Hydroxyl _____meq./g__ | 1.50 |
| Trans-isomer _____percent__ | 98 |
| Viscosity at 25° C. _____cp__ | —28,500 |

The above example was repeated with essentially the same results using various sizes of salt glazed pipes up to and including 24″ diameter pipe with no sign of deterioration in the bond between the pipe and the caulking composition.

Essentially the same results are obtained by replacing Multron R-12 with a polyester condensation product of one mole trimethylol propane, one mole propylene glycol, four moles ethylene glycol, and five moles adipic acid and replacing Multron R-18 with a condensation product of four moles propylene glycol, seven moles ethylene glycol and 10 moles adipic acid.

*Example II*

Example I was repeated with essentially the same results except that the primer used consisted of 10 parts Mondur TD-80 and 60 parts of a mixture consisting of 432 grams Multron R-18, 288 grams Multron R-12, 80 grams C.P. cadmium medium red #300 pigment, 72 grams methyl diethanolamine and 2,428 grams ethyl acetate.

A series of salt glazed joints were caulked with the composition of Example I using the primer of this example varying the age of the primer and the dry time of the primer on the pipe. The age of the primer was calculated from the time the primer exothermed. The results are set forth below.

| Age of primer | Dry time | Freeze-thaw cycles to failure |
|---|---|---|
| Initial | 10 minutes | >30 |
| Do | 30 minutes | 13 |
| Do | 1 hour | 10 |
| Do | 3 hours | 11 |
| Four hours | 10 minutes | >30 |
| Do | 30 minutes | 18 |
| Do | 1 hour | 28 |
| Do | 3 hours | 18 |

The pipe prepared using 10-minute dry times with both the freshly prepared primer and 4 hour old primer had excellent freeze-thaw durability. Surprisingly, as the age of the primer composition (pot life) increased, the freeze-thaw durability of the pipe bond increased. This was a desirable property since there was no danger of freeze-thaw durability loss so long as the primer did not set up in the pot.

*Example III*

Example I was repeated with essentially the same results using a tall oil modified fatty-acid polyester-styrene caulking composition (polyester sold under the name Stypol 3018). Stypol 3018 is believed to be 30 to 35% by weight monomeric styrene and 65 to 70% by weight polyester (composed of 40 parts phthalic anhydride, 35 parts diethylene glycol, 18 parts tall oil fatty acid esters and 7 parts maleic anhydride). A caulking composition was formulated from this polyester composition using 100 parts polyester, 140 parts silica flour in a catalyst system composed of Lupersol DDM, cobalt naphthenate and dimethyl aniline.

*Example IV*

Example I was repeated with essentially the same results except the primer used consisted of 10 parts Mondur TD-80 and 60 parts of a mixture consisting of 72 parts Multron R-18, 48 parts Multron R-12, 15.7 parts di- ethylcyclohexylamine, 10.7 parts diethylene glycol and 404 parts ethyl acetate. The freshly prepared primer composition was applied to the salt glazed pipe and allowed to dry for 10 minutes. The caulked pipe joint was cut axially after 10 freeze-thaw cycles, without any sign of deterioration in the bond between the caulking composition and the clay pipe.

*Example V*

Example I was repeated with essentially the same results except the primer used consisted of 10 parts Mondur TD-80 and 75 parts of a mixture consisting of 72 parts Multron R-18, 48 parts Multron R-12, 15.7 parts diethylcyclohexyl amine and 404 parts ethyl acetate. The salt glazed clay pipe joint was caulked after a 10 minute dry time. The pipe joint was cut axially after 10 freeze-thaw cycles with no deterioration in the bond between the caulking composition and the pipe.

*Example VI*

This example illustrates the use of a urethane primer having an 18 hour dry time. The primer used consisted of 36 parts Multron R-18, 24 parts Multron R-12, 30 parts ethyl acetate, 3 parts N,N,N',N'-tetrakis-(2-hydroxyethyl) ethylene diamine, 15 parts toluene and 30 parts Mondur TD-80. This primer was applied to an 8-inch clay pipe and allowed to dry for 18 hours. The caulking composition of Example I was then polymerized in situ in the same manner as described in Example I. The salt glazed pipe was cut axially after 20 freeze-thaw cycles.

*Example VII*

This example illustrates the use of a urethane primer having an 18 hour dry time and an extremely low ratio of isocyanate to hydroxyl groups. The primer used consisted of 30 parts Multron R-18, 30 parts Multron R-12, 30 parts acetone, 6 parts N,N,N',N'-tetrakis-(2-hydroxyethyl) ethylene diamine, 30 parts Mondur TD-80, and 15 parts toluene. A bond between the salt glazed clay pipe and the caulking composition of Example I failed after 27 freeze-thaw cycles.

*Example VIII*

This example illustrates that the primer composition of this invention must have at least one linear difunctional resinous component. Example VI was repeated using a primer comprising 30 parts Multron R-12, 50 parts acetone, 6 parts N,N,N',N'-tetrakis-(hydroxyethyl) ethylene diamine, 30 parts Mondur TD-80 and 15 parts toluene. After an 18-hour dry time, the salt glazed clay pipe was caulked with the composition of Example I. The bond between the caulking composition and the clay pipe joint failed on the 5th freeze-thaw cycle indicating that it was unsuitable for storage above ground during the winter months.

*Example IX*

Example I was repeated using a primer consisting of 30 parts Multron R-18, 20 parts Multron R-12, 50 parts ethyl acetate, 2.5 parts methyldiethanol amine, 25 parts Mondur TD-80 and 25 parts toluene. The salt glazed clay pipe was caulked after a 3 hour dry time and the joint had not failed after 30 freeze-thaw cycles.

*Example X*

Example I was repeated using a primer composition consisting of 30 parts Multron R-18, 20 parts Multron R-12, 50 parts ethyl acetate, and 5 parts methyldiethanol amine, 30 parts Mondur TD-80 and 25 parts toluene. After a 10-minute dry time, the salt glazed clay pipe was caulked and the bond between the caulking and the pipe had not failed after 30 freeze-thaw cycles.

*Example XI*

Example I was repeated with essentially the same results except that the 2-ethylhexyl fumaryloxy-hydroxy soybean oil was replaced by 70 parts of a decyl fumaryloxy-hydroxy soybean oil and the styrene content was increased to 30 parts with the 2-ethylhexyl acrylate omitted. The decyl fumaryloxy-hydroxy soybean oil was prepared by the technique described in Example I except that 0.7 mole of monodecyl fumarate was reacted with 1 equivalent of epoxidized soybean oil.

*Example XII*

Example I was repeated with essentially the same results except that the 2-ethylhexyl fumaryloxy-hydroxy soybean oil was replaced with 67 parts methylamyl fumaryloxy-hydroxy soybean oil which was prepared by the technique described in Example I using 1 mole of methylamyl alcohol in place of 1 mole 2-ethylhexanol.

*Example XIII*

Example I was repeated with essentially the same results except that the joint caulking composition was based on a methylamyl fumaryloxy-chloro soybean oil. The 4-methyl-2-pentanol (methylamyl alcohol) fumaryloxy-chloro soybean oil was prepared as follows. Maleic anhydride (0.8 mole) was heated to 110° C. in a reaction vessel equipped with a stirrer, a condenser and a reactant addition port. Eight-tenths of a mole of 4-methyl-2-pentanol was added over a 40 minute period while controlling the exothermic reaction at 110–114° C. This reaction temperature was maintained for an additional 20 minutes and then the reaction was cooled to 90° C. The resultant half-ester was isomerized at 90° C. for 25 minutes using 1.0 grams of aluminum trichloride. Two hundred grams of soybean oil and 0.03 gram of p-methoxy phenol were added rapidly to the vessel and the temperature was adjusted to 65° C. One mole of tertiary butyl hypochlorite was added over sixty minutes while maintaining the exothermic reaction at 65–70° C. The reaction temperature was maintained for an additional 30 minutes before vacuum distilling by-product tertiary butyl alcohol. The product was clear, pale-yellow liquid having a viscosity of 5,000 centipoises at 25° C. and an average of about 2-fumaryloxy groups per molecule and about 20% by weight of methylamyl hydrogen fumarate.

*Example XIV*

Example XIII was repeated with essentially the same results except that a 2-ethylhexyl fumaryloxy-chloro soybean oil was employed. The 2-ethylhexyl fumaryloxy-chloro soybean oil was prepared by the method described in Example XIII except that the 0.8 mole of methylamyl alcohol was replaced by 0.8 mole of 2-ethylhexanol.

*Example XV*

Example III was repeated using a polyester caulking composition based upon a polyester sold by Marco Chemical Company, formerly called Celanese MX-449. The polyester composition comprises 30 to 35% by weight styrene and a polyester based upon phthalic acid and maleic acid. The caulking composition contained 100 parts resin forming ingredient, 100 parts silica flour, Lupersol DDM cobalt naphthenate, and dimethyl aniline. The caulking had excellent adhesion to the salt glazed clay pipe.

Essentially the same results were obtained by replacing the above polyester with a De Soto polyester-styrene composition No. 10-274 based upon phthalic acid and maleic acid.

*Example XVI*

A 6" by 18" unglazed ceramic tile was coated with a thin layer of the primer described in Example I and allowed to dry for 10 minutes. The composition consisting of 70 parts of a rigid polyester composed essentially of triethylene glycol fumarate, 25 parts styrene, 20 parts titanium dioxide, 1 part of 6% by weight cobalt octoate in a hydrocarbon solvent, 3 parts cellulose acetate butyrate in a 10% by weight solution of butyl acetate was sprayed on the primed tile. The polyester composition was allowed to begin to cure and after 15 minutes, a second coat of the same composition was sprayed on the first coat. After one hour, the glazed tile was placed in an oven at 150° F. The pigmented coating had excellent adhesion to the unglazed clay tile.

Essentially the same results were obtained by allowing the second sprayed coat to dry overnight at room temperature.

Since many embodiments of this invention may be made and since many changes may be made in the embodiments described the foregoing is to be interpreted as illustrative only and my invention is defined by the claims appended hereafter.

I claim:

1. The method of forming a bonded multi-layer structure including a substrate and an in situ polymerized layer, which comprises the steps of (1) providing a prepolymer reaction product of an organic polyhydroxy material having an average acid number from 0 to 10 and at least 1.2 equivalents of organic polyisocyanate per equivalent of organic polyhydroxy material, wherein said organic polyhydroxy material comprises an essentially difunctional linear condensation polymer having a hydroxyl number of from about 20 to 100 selected from the group consisting of polyethers, polyesters and mixtures thereof, (2) applying said prepolymer reaction product to said substrate, (3) drying said prepolymer reaction product, (4) applying on said dried reaction product an in situ addition-polymerizable resin forming composition comprising a polyethylenically unsaturated material and a monoethylenically unsaturated material selected from the group consisting of monovinylidene compounds, half-esters of alpha,beta-ethylenically unsaturated dicarboxylic acids and mixtures thereof, wherein at least one of said unsaturated materials contains active Zerewitinoff hydrogen groups, and (5) polymerizing said addition-polymerizable composition to bond the resulting polymerizate to said substrate.

2. The method of claim 1 wherein said in situ addition-polymerizable composition comprises an ethylenically unsaturated polyester and a monovinyl aromatic compound.

3. The method of claim 2 wherein said polyisocyanate comprises a diisocyanate and said organic polyhydroxy material comprises from 1 to 4 parts by weight of an essentially difunctional linear condensation polymer having a hydroxyl number of from 20 to 100 selected from the group consisting of polyethers, polyesters and mixtures thereof and from 4 to 1 parts by weight of a polyhydroxy organic material having at least 3 hydroxy groups.

4. The method of claim 3 wherein said prepolymer reaction product comprises a tertiary amine catalyst.

5. The method of claim 4 wherein said tertiary amine catalyst is methyl diethanol amine.

6. The method of claim 4 wherein said polyhydroxy material comprises from 3 to 1 parts by weight of an essentially difunctional linear condensation polyester of an aliphatic dicarboxylic acid and an aliphatic glycol, said polyester having an hydroxyl number of from 20 to 100, and from about 2 to 3 parts by weight of polyhydroxy organic compounds having at least 3 hydroxyl groups comprising a condensation polyester of a polyhydric alcohol having at least three hydroxyl groups, an aliphatic glycol and an aliphatic dicarboxylic acid.

7. The method of claim 6, wherein said diisocyanate comprises toluene diisocyanate and at least 2 equivalents of diisocyanate are present per equivalent of polyhydroxy material.

8. The process of claim 2 wherein said ethylenically unsaturated material is an ethylenically unsaturated polyester having from about 95 to 50 mole percent saturated dicarboxylic acid units and from about 5 to 50 mole percent alpha,beta-ethylenically unsaturated dicarboxylic acid units.

9. The process of claim 8 wherein the polymerization product of said in situ polymerizable resin forming materials has an elastic modulus of less than 150,000 p.s.i.

10. The process of claim 7 wherein said ethylenically unsaturated polyester is composed primarily of triethylene glycol units and fumaric acid units.

11. The process of claim 1, wherein said substrate is structural clay product.

12. In the process of forming a close tolerance pipe joint end which comprises caulking said pipe joint with an in situ polymerizable composition, the improvement which comprises the steps of (1) providing a prepolymer reaction product of an organic polyhydroxy material having an average acid number of from 0 to 10 and at least 1.2 equivalents of organic polyisocyanate per equivalent of organic polyhydroxy material, wherein said organic polyhydroxy material comprises an essentially difunctional linear condensation polymer having a hydroxyl number of from about 20 to 100 selected from the group consisting of polyethers, polyesters and mixtures thereof, (2) applying said prepolymer reaction product to said pipe joint, (3) drying said prepolymer reaction product, (4) placing said pipe joint end within a ring mold having a close-tolerance surface facing a surface of said end and radially spaced therefrom, (5) depositing an in situ addition-polymerizable composition comprising (A) filler and (B) resin-forming components comprising a polyethylenically unsaturated material and a monoethylenically unsaturated material selected from the group consisting of monovinylidene compounds, half-esters of alpha, beta-ethylenically unsaturated dicarboxylic acids and mixtures thereof, wherein at least one of said unsaturated materials contains active Zerewitinoff hydrogen and the copolymerization product of said resin-forming ingredients by themselves has an elastic modulus of from 10–150,000 p.s.i., and (6) polymerizing said in situ addition-polymerizable composition bonding said pipe end surface to said in situ polymerized composition.

13. The method of claim 12 wherein said polyisocyanate comprises a diisocyanate and said organic polyhydroxy material comprises from 1 to 4 parts by weight of an essentially difunctional linear condensation polymer having a hydroxyl number of from 20 to 100 selected from the group consisting of polyethers, polyesters and mixtures thereof and from 4 to 1 parts by weight of a polyhydroxy organic material having at least three hydroxy groups.

14. The method of claim 13 wherein said prepolymer reaction product comprises a tertiary amine catalyst.

15. The method of claim 14 wherein said tertiary amine catalyst is methyl diethanolamine.

16. The method of claim 14 wherein said polyhydroxy material comprises from 3 to 1 parts by weight of an essentially difunctional linear condensation polyester of an aliphatic dicarboxylic acid and an aliphatic glycol, said polyester having a hydroxyl number of from 20 to 100, and from about 2 to 3 parts by weight of polyhydroxy organic compound having at least three hydroxyl groups and comprising a condensation polyester of a polyhydric alcohol having at least three hydroxyl groups, an aliphatic glycol and an aliphatic dicarboxylic acid.

17. The method of claim 16 wherein said diisocyanate comprises toluene diisocyanate and at least 2 equivalents of diisocyanate are present per each equivalent of polyhydroxy material.

18. The process of claim 13 wherein component A of said in situ polymerizable composition comprises from 40 to 80 weight percent of said composition and component B comprises from 60 to 20 weight percent of said composition.

19. The process of claim 18 wherein the monovinylidene compound comprises a monovinyl aromatic.

20. The process of claim 19 wherein the polyethylenically unsaturated material is an ethylenically unsaturated polyester having from about 95–50 mole percent saturated dicarboxylic acid units and from about 5–50 mole percent alpha,beta-ethylenically unsaturated dicarboxylic acid units.

21. The process of claim 19 wherein said polyethylenically unsaturated material is an acryloxy-substituted fatty acid ester having on an average at least 1.3 acryloxy groups per molecule.

22. The process of claim 12, wherein said pipe joint is a structural clay pipe joint.

23. The process of claim 12, wherein said pipe joint is a salt glazed clay pipe joint.

24. A bonded multi-layer structure including a substrate having on at least one surface thereof a polyurethane primer layer, wherein said polyurethane is the reaction product of an organic polyhydroxy material having an average acid number of from 0 to 10 and at least 1.2 equivalents of organic polyisocyanate per equivalent of organic polyhydroxy material, wherein said organic polyhydroxy material comprises an essentially difunctional linear condensation polymer having a hydroxyl number of from 20 to 100 selected from the group consisting of polyethers, polyesters and mixtures thereof, an in situ addition-polymerized resinous composition bonded to said primer layer, wherein said in situ polymerized composition comprises the reaction product of a polyethylenically unsaturated material and a monoethylenically unsaturated material selected from the group consisting of monovinylidene compounds, half-esters of alpha,beta-ethylenically unsaturated dicarboxylic acids and mixtures thereof, wherein at least one of said unsaturated materials contains active Zerewitinoff hydrogen groups.

25. The product of claim 24 wherein said substrate is a structural clay product.

26. The product of claim 24 wherein said substrate is a salt glazed clay product.

27. The product of claim 24 wherein said substrate is an unglazed clay product.

28. The product of claim 25 wherein said polyisocyanate comprises a diisocyanate and said polyhydroxy material comprises from 3 to 1 parts by weight of an essentially difunctional linear condensation polyester of an aliphatic dicarboxylic acid and an aliphatic glycol, said polyester having a hydroxyl number of from 20 to 100, and from about 2 to 3 parts by weight of polyhydroxy organic compound having at least three hydroxyl groups and comprising a condensation polyester of a polyhydric alcohol having at least three hydroxyl groups, an aliphatic glycol and an aliphatic dicarboxylic acid.

29. The product of claim 28 wherein said polyethylenically unsaturated material is an ethylenically unsaturated polyester.

30. The product of claim 29 wherein said polyethylenically unsaturated material is an acryloxy-substituted fatty acid ester having on an average of at least 1.3 acryloxy groups per molecule.

31. A urethane primer composition for use with an in situ addition-polymerizable polyethylenically unsaturated material comprising a prepolymer reaction product of an organic polyhydroxy material having an average acid number of from 0 to 10 and at least 1.2 equivalents of organic polyisocyanate per equivalent of organic polyhydroxy material, said polyisocyanate comprising a diisocyanate and said organic polyhydroxy material including from 1 to 4 parts by weight of an essentially difunctional linear condensation polymer having a hydroxyl number of from about 20 to 100 selected from the group consisting of polyethers, polyesters and mixtures thereof, and from 4 to 1 parts by weight of polyhydroxy organic material having at least 3 hydroxyl groups.

32. The composition of claim 31 wherein said prepolymer reaction product comprises a tertiary amine catalyst.

33. The composition of claim 32 wherein said tertiary amine catalyst is methyl diethanol amine.

34. The composition of claim 23 wherein said polyhydroxy material comprises from 3 to 1 parts by weight of an essentially difunctional linear condensation polyester of an aliphatic dicarboxylic acid and an aliphatic glycol, said polyester having a hydroxyl number of 20 to 100, and from about 2 to 3 parts by weight of polyhydroxy organic material having at least 3 hydroxyl groups comprising a condensation polyester of a polyhydric alcohol having at least 3 hydroxyl groups, an aliphatic glycol and an aliphatic dicarboxylic acid.

35. The composition of claim 34 wherein said polyhydroxy organic compound having at least 3 hydroxyl groups comprises a condensation polyester of a polyhydric alcohol selected from the group consisting of trimethylol propane and trimethylol ethane, an aliphatic glycol selected from the group consisting of ethylene glycol and propylene glycol and an aliphatic dicarboxylic acid, wherein said polyester has a hydroxyl number of from about 120 to 225.

36. The composition of claim 34 wherein said diisocyanate comprises toluene diisocyanate and at least 2 equivalents of diisocyanate are present for each equivalent of polyhydroxy material.

37. The composition of claim 31 wherein the composition is dissolved in a non-reactive organic solvent having no active Zerewitinoff hydrogen groups.

38. The composition of claim 31 wherein said primer comprises a non-reactive pigment.

References Cited by the Examiner
UNITED STATES PATENTS

| | | | |
|---|---|---|---|
| 2,430,479 | 11/1947 | Pratt et al. | 156—331 |
| 2,622,901 | 12/1952 | Seymour et al. | 156—293 X |
| 2,663,662 | 12/1953 | Graf et al. | 156—293 X |
| 2,721,159 | 10/1955 | Johnston | 156—293 X |
| 2,769,826 | 11/1956 | Yoho | 156—331 X |
| 2,894,932 | 7/1959 | Bader et al. | 161—214 X |
| 2,953,489 | 9/1960 | Young | 156—331 |
| 3,063,958 | 11/1962 | Perkins et al. | 156—331 X |
| 3,088,934 | 5/1963 | Bonanni | 156—331 X |

EARL M. BERGERT, *Primary Examiner.*

UNITED STATES PATENT OFFICE
CERTIFICATE OF CORRECTION

Patent No. 3,219,516                          November 23

David Stanley Cobbledick

It is hereby certified that error appears in the above numbered patent requiring correction and that the said Letters Patent should corrected below.

Column 2, line 67, for "wil" read -- will --; column 3, line 14, for "polymerizale" read -- polymerizable --; line 59, for "fromed" read -- formed --; line 71, for "trial" read -- triol --; column 6, lines 69 to 70, the formula should appear as shown below instead of as in the patent:

column 7, line 16, for "unsatruated" read -- unsaturated --; column 10, line 2, for "if" read -- of --; line 34, for "bis-1-hydroxy" read -- bis-(1-hydroxy --; column 11, line 32, after "glazed" insert -- pipe --; column 15, line 9, after "is" insert -- a --; column 16, line 74, for "comprisse" read -- comprises --.

Signed and sealed this 20th day of September 1966.

(SEAL)
Attest:

ERNEST W. SWIDER                          EDWARD J. BRENNER
Attesting Officer                      Commissioner of Patents